United States Patent [19]

Fehr

[11] 4,006,804
[45] Feb. 8, 1977

[54] ELECTROMAGNETICALLY-ACTUATABLE ROTARY VANE PUMP FOR USE AS A HYDRAULIC BRAKE

[75] Inventor: Henri Fehr, Montmorency, France

[73] Assignee: Compagnie de Construction Mechanique Sulzer, Paris, France

[22] Filed: Apr. 21, 1975

[21] Appl. No.: 569,787

[30] Foreign Application Priority Data

Apr. 29, 1974 France ............................. 74.14846
July 18, 1974 France ............................. 74.25010

[52] U.S. Cl. ............................. 188/293; 192/58 R; 418/158; 418/177
[51] Int. Cl.² .................. F16D 57/02; F16D 57/06
[58] Field of Search .......... 188/290, 291, 293, 294, 188/231; 192/58 R; 418/158, 177

[56] References Cited

UNITED STATES PATENTS

| | | | |
|---|---|---|---|
| 1,896,448 | 2/1933 | Kercher | 418/158 X |
| 1,932,334 | 10/1933 | Conger et al. | 188/294 |
| 2,952,249 | 9/1960 | Conover, Jr. | 418/158 X |

FOREIGN PATENTS OR APPLICATIONS 681,601   2/1930   France ................. 418/158

*Primary Examiner*—George E. A. Halvosa
*Attorney, Agent, or Firm*—Werner W. Kleeman

[57] ABSTRACT

A rotary vane pump incorporating radially displaceable sliding vanes. The sliding vanes can be electromagnetically actuated in order to permit use of the rotary vane pump as a hydraulic brake.

11 Claims, 9 Drawing Figures

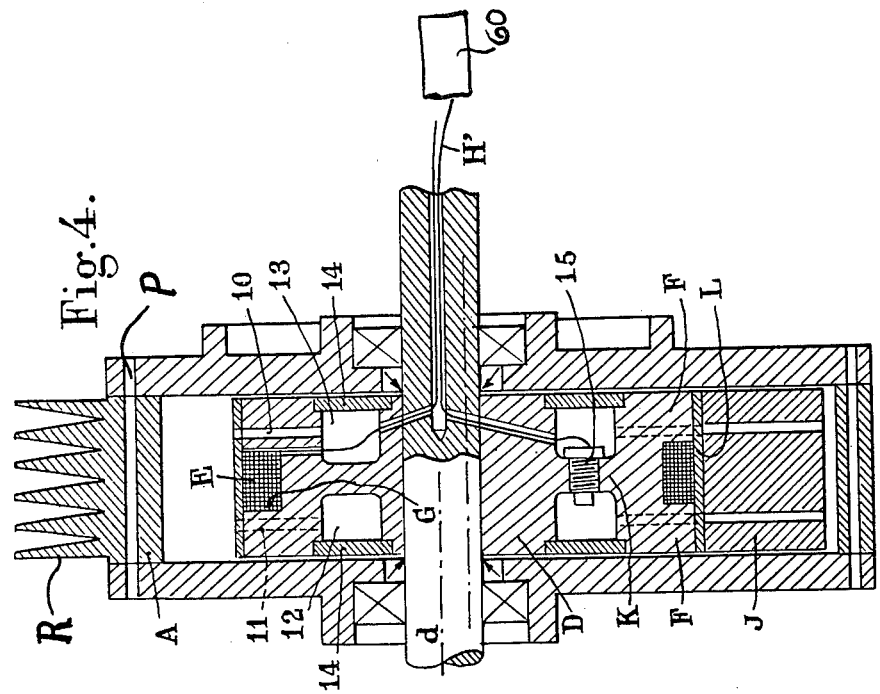
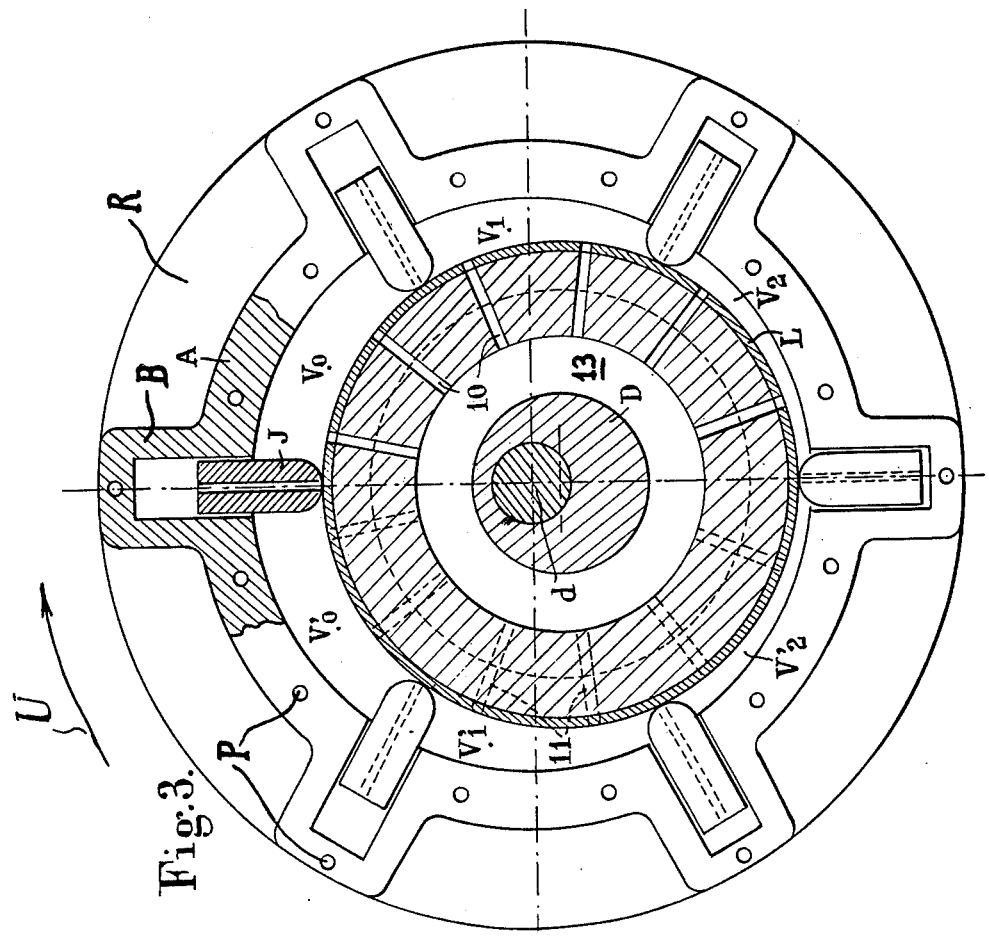

ELECTROMAGNETICALLY-ACTUATABLE ROTARY VANE PUMP FOR USE AS A HYDRAULIC BRAKE

BACKGROUND OF THE INVENTION

The present invention broadly relates to the art of positive-displacement pumps, and in particular concerns a new and improved construction of electromagnetically-actuatable rotary vane-type pump incorporating radially displaceable sliding vanes or plates and wherein such pump can be employed as a hydraulic brake.

There are known to the art numerous types of electromagnetically-actuatable brakes, such as for instance, eddy current brakes wherein the braking effect is reduced with decreasing rotational speed and which cannot be used however as a standstill brake. Moreover, the removal of the heat which evolves during the braking action is associated with certain difficulties.

Another state-of-the-art magnetic brake uses a filling of magnetizable granules or filings which are admixed with a braking oil and when the excitation current is turned-on form more or less solid bridges between the stator and the rotor. What is disadvantageous with this type of brake is that certain frictional losses also prevail during idling.

Finally, different constructional manifestations of brakes are known to the art which work according to the principle of a positive-displacement pump and circulate a braking fluid, the braking action being produced by a throttle location which is arranged between the pressure side and the suction side of the pump. Such positive-displacement pumps are typically reciprocating or piston pumps embodying a multiplicity of radial pistons arranged about an eccentric by means of which these pistons are actuated. Also in this case during idling there cannot be avoided an appreciable braking action. Moreover, such type brake requires a considerable amount of space.

SUMMARY OF THE INVENTION

Hence, with the foregoing in mind it is a primary object of the present invention to provide an improved construction of electromagnetically-actuatable rotary vane pump which can be used as a hydraulic brake and is not associated with the aforementioned drawbacks and shortcomings of the prior art proposals.

Another and more specific objecct of this invention aims at the provision of a pump of the aforementioned character wherein there can be realized an intensive circulation of a braking fluid with small spatial requirements, the throttle locations of the pump being electrically or electromagnetically controlled, there is insured for good withdrawal of the heat which is developed during the braking effort and which pump can also be effectively utilized as a standstill or stopping brake.

Now in order to implement these and still further objects of the invention which will become more readily apparent as the description proceeds, the rotary vane pump of this development is manifested by the features that the sliding vanes or plates of such pump can be electromagnetically actuated so that such pump can be used as a hydraulic brake.

If such type rotary vane pump carries an excitation coil or winding at its stator then this arrangement affords the advantage that there are not required any moved sliding contacts, such as slip rings and so forth, and the electromagnetic force acting upon the sliding vanes can be adjusted by changing the current intensity of the current flowing through the excitation winding.

A preferred embodiment of the invention contemplates that the pump possesses in conventional manner at both the pressure side and the suction side working chambers which are connected with one another by throttle locations or throttles. These throttle locations or throttles can be constructed to be adjustable over wide limits in conventional manner with the aid of a mechanical, electrical, hydraulic or pneumatic control device independent of the current flowing through the excitation coil or winding.

According to a particularly advantageous constructional manifestation of the invention, there is provided a rotary vane pump —also known in the art as a rotary sliding vane pump— which comprises a non-magnetizable, pressure-tight rotor housing which is rigidly connected with the element or component which is to be braked, the rotor housing being mounted to be rotatable about a stationary shaft or axle. Further, the rotor housing encloses a substantially cylindrical internal compartment which is arranged coaxially with respect to the fixed shaft and sealed in a pressure-tight fashion at both ends by substantially flat flanges or end plates oriented perpendicular to the shaft. Within this internal compartment there is arranged a substantially cylindrical stator which is secured axially parallel to the stationary shaft but offset eccentrically through an eccentric distance S, wherein the outer diameter of the stator is smaller at least by the value 2S than the inner diameter of the internal compartment of the rotor housing.

A particularly preferred constructional embodiment of the invention resides in the features that there is arranged at the circumference or periphery of the stator a magnetizable ring having a substantially U-shaped cross-sectional configuration, at the outer surface of which there extends in the circumferential direction a coaxial groove or channel which accommodates a concentric excitation coil or winding and closed in a pressure-tight manner by a sleeve formed of non-magnetizable material. The rotor housing further possesses guide grooves which are uniformly distributed over the periphery of the rotor housing, these guide grooves extending radially and being open in the direction of the internal compartment of the housing and having parallel walls. Furthermore, such guide grooves are bounded or delimited in the axial direction by the closure flanges or end plates of the rotor housing. In each guide groove there is movably guided in radial direction a respective magnetizable slide vane or plate, these slide vanes being movable towards the sleeve encasing the stator owing to the action of a magnetic flux induced in the stator ring due to the current flowing through the excitation coil. Finally, the guide grooves and the endless working compartment located between the rotor housing and the sleeve of the stator are filled with a braking fluid.

It is possible to construct the rotor housing to be especially light in weight and nonetheless possessing good strength properties if the rotor housing is provided at its outer surface with radially outwardly protruding members or protuberances which enclose the guide grooves for the sliding vanes or sliding plates. These radially outwardly directed protuberances are connected with one another by cooling fins or ribs extending in the circumferential direction. In this way there are realized good conditions for the removal of the heat or thermal energy released during the braking action. An improvement of the regulatability of the braking force as a function of the excitation current can be obtained in that the lengthwise edge of each of the sliding vanes and which lengthwise edges are in operable association or coaction with the stator are constructed of rounded configuration such that fluid passing thereunder forms a liquid wedge, which liquid wedge provides a lubricating function and produces a hydrodynamic force opposing the magnetic force.

In order to facilitate the movement of the sliding vanes within their guide grooves and to permit the entry of braking fluid into the guide grooves, the sliding vanes can be provided with bores for the throughpassage of braking fluid between the base of each guide groove and the internal compartment of the rotor housing.

A particularly advantageous construction of the throttle locations or throttles is realized if the stator is provided with a cylindrical rotary slide valve in order to form a throttle location. At the outer surface of such rotary slide valve there are provided at a uniform spacing from one another longitudinal grooves extending in the axial direction and at least one groove extending in the circumferential or peripheral direction for interconnecting the aforementioned longitudinal grooves. Moreover, in one pole leg of the magnetizable ring or ring member of the stator there are distributed over one-half of the periphery thereof and at the same angular spacings as the longitudinal grooves radial bores which are flow connected with the pressure side working chambers or compartments and the diameter of which is smaller than the width of the longitudinal grooves. In the other pole leg there are provided analogous bores which extend over the other half of the periphery and flow communicate with the suction side working chambers or compartments. The angular position of the rotary slide valve and thus the longitudinal grooves can be adjusted relative to the radial bores as can also the edges of the side walls of the longitudinal grooves which more or less cover the inner opening of the bores and which form the adjustable throttle location.

BRIEF DESCRIPTION OF THE DRAWINGS

The invention will be better understood and objects other than those set forth above, will become apparent when consideration is given to the following detailed description thereof. Such description makes reference to the annexed drawings in conjunction with which there will be described in detail the basic construction and mode of operation of a number of exemplary embodiments of rotary vane pumps which can be electromagnetically actuated and employed as brakes. Further, it is to be understood that throughout the various Figures the same reference characters have been used for the same components of the differently illustrated exemplary embodiments.

FIG. 3 is a cross-sectional view of a rotary vane pump similar to the showing of FIG. 1, but further illustrating an additional throttle location which is independent of the excitation current;

FIG. 4 is a longitudinal sectional view of the embodiment of pump shown in FIG. 3;

DETAILED DESCRIPTION OF THE INVENTION

Figure 2:
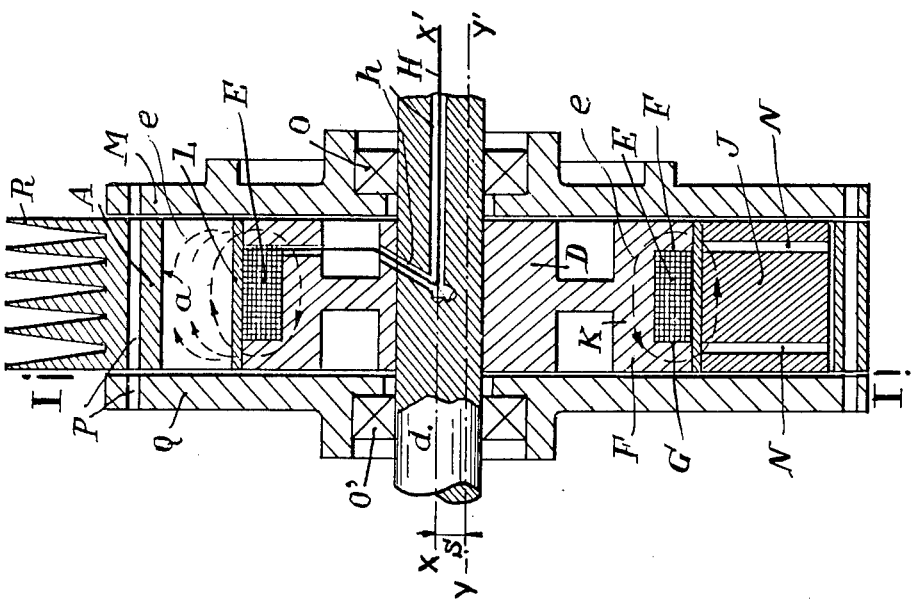
FIG. 2 is a longitudinal sectional view of the pump structure shown in FIG. 1, taken substantially along the line II—II thereof.

Describing now the drawings, in the embodiments of FIGS. 1 to 4 it is to be understood that reference character A designates a rotor housing formed of non-magnetizable material possessing good thermal conductivity. This rotor housing A is rotatably mounted on a stationary shaft or axle $d$ by means of the substantially parallel, smooth flanges or end plates M, Q and two roller bearings O, O'. Rotor housing A encloses a substantially cylindrical-shaped internal compartment or chamber $a$ and is provided at its outer surface with a number of protuberances or projecting members B which are interconnected with one another in the circumferential direction by means of cooling fins or ribs R. Each such protuberance or radially projecting member B encloses a guide groove or channel C having parallel side walls $b$ and opening in the direction of the internal compartment $a$, as clearly shown in FIGS. 1 and 3.

Continuing, within each guide groove C there is guided a respective sliding vane or sliding plate J —hereinafter generally referred to as a sliding vane— for movement in the radial direction. Each sliding vane J is formed of a magnetizable material. A cylindrical stator or stator body D, K, L is stationarily secured to the shaft or axle $d$ within the substantially cylindrical-shaped internal compartment $a$. The geometric axis $y-y'$ of this substantially cylindrical-shaped stator D, K, L is eccentrically offset by the amount S in relation to the geometric axis $x-x'$ of the rotor housing A and the stationary or fixed shaft $d$. The outer diameter of the stator D, K, L is smaller than the inner diameter of the internal compartment $a$ by an amount corresponding to at least 2S.

Considering the structure of the stator D, K, L the component D thereof constitutes the hub of such stator which carries at its periphery or circumference a magnetizable ring or ring member K of substantially U-shaped cross-sectional configuration, the lateral or side legs F of which enclose a groove G extending in the circumferential direction, this groove being open towards the outside, as best seen by referring to FIGS. 2 and 4. Embedded in groove G is a substantially ring-shaped excitation coil or winding E. A cylindrical sleeve L formed of non-magnetizable material closes the groove G and the excitation winding E in a pressure-tight manner with respect to the internal compartment a of the rotor housing. The excitation coil or winding E is supplied with an adjustable excitation current, preferably a direct-current or a rectified alternating-current, by means of conductor or line H which is introduced into the stator in electrical connection with the excitation coil by means of the bores h extending through the shaft d and the stator components D, K. Consequently, a magnetic flux is induced in the magnetizable ring member or ring K and which has been schematically portrayed in FIG. 2 by the broken line loops e and which magnetic flux closes into a magnetic circuit via the slide or sliding vanes J. As soon as there is a flow of the excitation current the sliding vanes J are attached, due to the action of the magnetic flux e, in the direction of the magnetized ring member K including its magnetized lateral legs, until such sliding vanes bear against the stator sleeve L.

The rotor housing A is held together in its assembled state by tie rods or equivalent structure which has not been particularly shown and which piercingly extend through the bores P and serve to connect the flanges or side plates M and Q in a pressure-tight manner with the ring-shaped portion of the rotor housing A. The internal compartment a and the guide grooves C of the rotor housing A are completely filled with a suitable brake fluid, the viscosity of which should be independent of temperature as far as possible.

Having now had the benefit of the foregoing discussion the mode of operation of the above-described exemplary embodiment of FIGS. 1 and 2 will be now considered in detail and is as follows: The rotor housing A is fixedly connected with the element or component which is to be braked, for instance a coupling or a transmission, (not particularly shown to preserve clarity in illustration), and rotates in the clockwise direction indicated by the arrow U about the shaft or axle d. Due to the action of the centrifugal force the sliding vanes J are propelled outwardly against the base or floor of the guide grooves C. In this condition the brake is operating in its idling state since the brake liquid or fluid located in the internal compartment a flows about the stator D, K, L with very little friction. As soon as the excitation current is generated then initially that sliding vane which is located at the region Z of smallest spacing between the stator D, K, L and the rotor housing is attracted towards such stator. During further rotation of the rotor housing the sliding vane remains in operable association with the stator in that it slides over and past the stator sleeve or sleeve member L. Due to the eccentricity S between the rotor housing A and the stator D, K, L there are formed between each two successive sliding vanes J at the suction side of the system the working compartments or chambers $V_0'$, $V_1'$, $V_2'$ and between which there prevails an appreciable pressure differential. Since the longitudinal edges 50 of the sliding vanes J which bear against the sleeve L are rounded a fluid wedge is formed between each such longitudinal or lengthwise extending edge 50 and the sleeve L which lifts the associated sliding vane J against the magnetic force by a small amount in such a manner that the rounded edge functions as a throttle or throttle location between each two adjacently situated working chambers $V_0'$, $V_1'$, $V_2'$. The width of the slot forming the throttle location and the thickness of the fluid wedge is determined by the magnetic force of attraction acting upon the sliding vanes J and can be controlled by changing the current intensity in the excitation coil or winding E.

Figure 1:
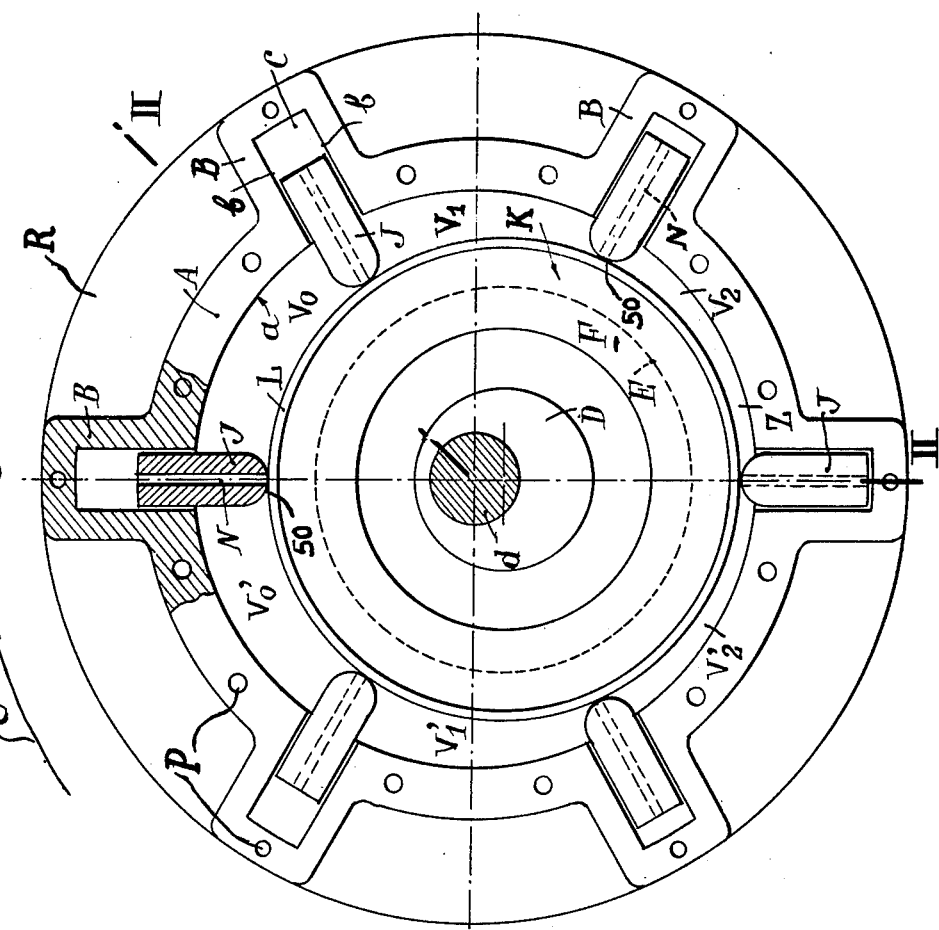
FIG. 1 is a cross-sectional view of an embodiment of rotary vane pump constructed according to the teachings of the invention and used as a hydraulic brake, the sectional view being taken substantially along the line I—I of FIG. 2.

The working chambers $V_0$, $V_1$, $V_2$ located at the right-hand side of FIG. 1 are disposed at the pressure side of the rotary vane pump. They narrow in size until they again arrive at the region Z where the spacing between the stator D, K, L and the rotor housing A is smallest. Also at the pressure side of the pump there prevails a considerable pressure differential between two adjacently situated working chambers or compartments $V_0$, $V_1$, $V_2$, just as was the case at the suction side of the pump as discussed above.

As long as there is a flow of the excitation current a braking force is therefore exerted at each sliding vane J in the circumferential direction and which can be adjusted by the current intensity of the excitation current.

The sliding vanes J are freely movable in the radial direction since the braking fluid contained at the base of each of the guide grooves C can flow freely through the bores N formed in the sliding vanes into the internal compartment a and then back again into the corresponding guide groove C.

In FIGS. 3 and 4 there is disclosed a further embodiment of rotary vane pump according to the invention wherein however its construction and mode of operation is basically the same as discussed above with respect to the embodiment of rotary vane pump portrayed in FIGS. 1 and 2. Hence, as a matter of convenience there will now only be considered the differences of the embodiment of pump of FIGS. 3 and 4 from that of the embodiment of FIGS. 1 and 2. In the arrangement disclosed in FIGS. 3 and 4 there is additionally provided at the stator D, K, L a throttle location or throttle 15 which is adjustable independently of the excitation current, throttle 15 being constituted for instance by a throttle valve which is controlled through the agency of a line H' in conventional manner mechanically, hydraulically or pneumatically or in some other suitable way, the control mechanism therefore being schematically indicated in FIG. 4 by reference character 60. Since the nature of the control is in no way crucial to the inventive aspects details of the control mechanism 60 have not been shown to simplify the disclosure.

Now in this arrangement the stator D, K, L is provided at the suction side of the pump with a substantially ring-shaped or annular work or working compartment 12 which flow communicates via the bores 11 with the working or work chambers $V_0'$, $V_1'$, $V_2'$. An analogous working compartment or chamber 13, however arranged at the pressure side of the pump, is in flow communication via the bores 10 with the pressure-side working chambers $V_0$, $V_1$, $V_2$. The throttle location or throttle means 15 is disposed between both of the working compartments 12 and 13 which are sealed towards the outside in a pressure-tight fashion by the substantially ring-shaped plates 14.

Figure 6:
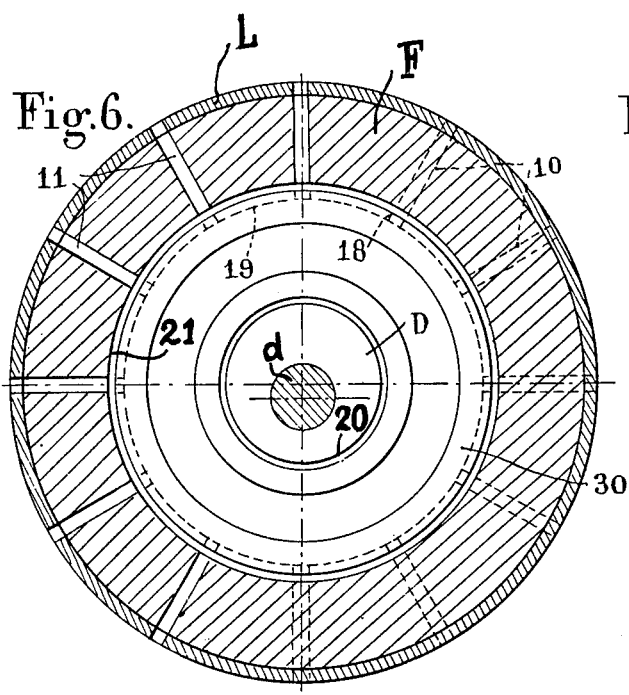
FIG. 6 is a cross-sectional view through the stator body or stator of FIG. 5.
Figure 5:
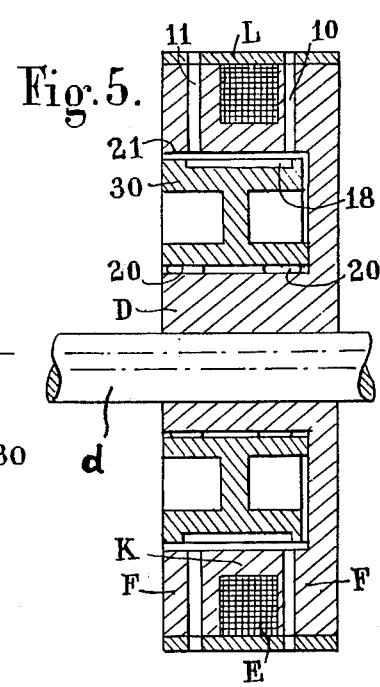
FIG. 5 is a longitudinal sectional view through the stator of a rotary vane pump equipped with a substantially cylindrical rotary slide valve functioning as a throttle location.
Figure 7:
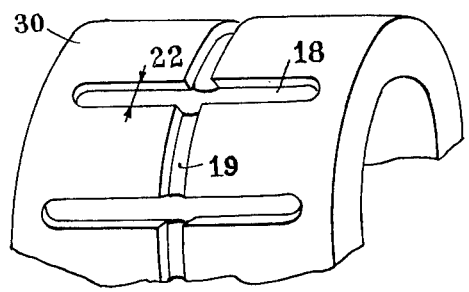
FIG. 7 is a fragmentary perspective view showing details of the outer surface of the rotary slide valve employed in the pump arrangement shown in FIGS. 5 and 6 and illustrating the longitudinal- and transverse grooves for forming throttle locations.

Instead of using a throttle valve 15 it is equally possible for the throttle location to be constituted by a substantially cylindrical-shaped rotary slide valve 30 as the same has been shown in FIGS. 5 to 7. As best seen by referring to FIG. 7 the outer surface of the rotary slide valve 30 possesses longitudinal or lengthwise extending grooves 18, the width of which has been designated by reference character 22 and their angular distribution about the circumference or periphery of such rotary slide valve coincides with that of the radial bores 10, 11 in the legs F of the magnetizable ring member or ring K. In the circumferential or peripheral direction these longitudinal grooves 18 are connected with one another by means of at least one transverse groove 19. The rotary slide valve 30 is rotatable relative to the magnetizable ring K and thus equally with respect to the bores 10 and 11. If the position of the lengthwise or longitudinal grooves 18 coincide with the position of the bores 10, 11, then braking fluid can flow practically freely from the pressure side of the pump through the bores 10, the grooves 18, 19 and the bores 11 to the suction side of the rotary vane pump. Now if the rotary slide valve 30 is rotated, with the aid of a suitable control mechanism, which can be independent of the excitation current and indicated in FIG. 5 by the centering rings 20, relative to the bores 10 and 11 in the circumferential direction, then it will be appreciated that the edges of the side walls of the longitudinal grooves 18 together with the inner openings of the bores 10, 11 form an adjustable throttle location.

Figure 8:
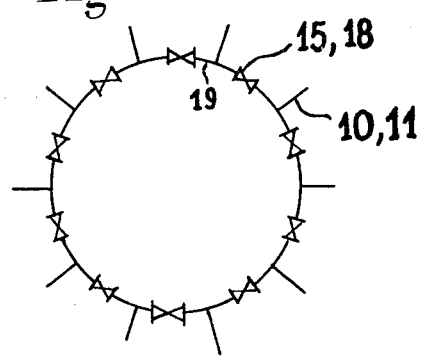
FIG. 8 is a schematic representation of a ring-shaped throttle location arrangement.

FIG. 8 schematically illustrates an arrangement of the grooves 18, 19 as well as the bores 10, 11 and throttle valves 15 respectively, wherein the throttle locations are connected in series and which can be reduced to practice in the manner illustrated in FIG. 7 by any one skilled in this art. Due to the large number of throttle locations 10, 11, 15, 18 it is possible in this manner to considerably reduce the braking resistance which is present during idling.

Figure 9:
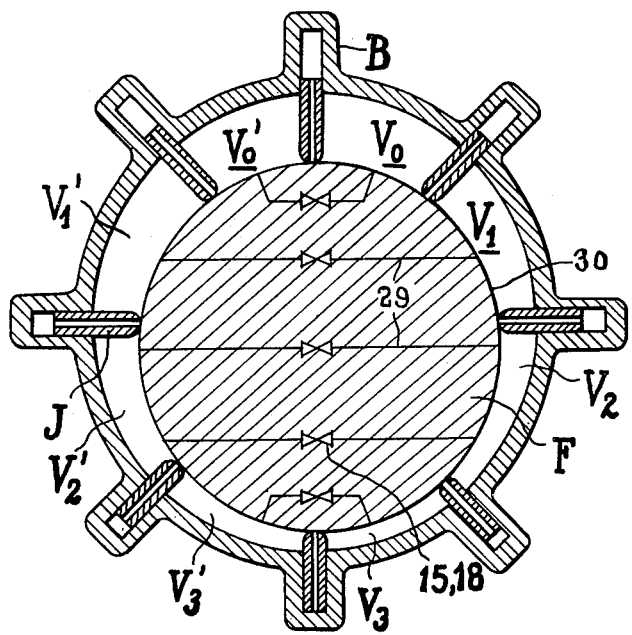
FIG. 9 is a schematic simplified cross-sectional view of a rotary vane pump constructed according to the invention and having parallel connected throttle locations.

A different, namely a parallel arrangement of the throttle locations 15, 18 between the suction side and pressure side of the pump has been finally shown in FIG. 9. In this arrangement a multiplicity of parallel arranged grooves 29 are provided, which can be realized analogous to the circumferential grooves 19 or by means of suitable bores, these grooves 29 establishing the flow communication between the suction side and pressure side and the throttle locations respectively.

It is to be appreciated that the invention is by no means intended to be limited to the above-described exemplary embodiments and quite to the contrary any one skilled in the art, while relying upon the described features and underlying concepts of the present development, will be able to realize other constructional manifestations which embody the basic concepts of the invention and which fall within the scope of the following claims.

What is claimed is:
1. A rotary vane pump, comprising a rotor housing filled with a braking fluid, a stator eccentrically arranged within the rotor housing, said stator possessing a constant eccentricity with respect to the rotor housing, a plurality of radially displaceable sliding vanes disposed within the rotor housing, each sliding vane having a longitudinal edge coacting with the stator, each two successive sliding vanes forming therebetween a working chamber, the braking fluid in the working chambers to each side of each sliding vane being at different pressures during operation, means for electromagnetically actuating said sliding vanes to enable said rotary vane pump to function as a hydraulic brake, said electromagnetically actuating means comprises an excitation winding carried by said stator, the flow of an excitation current through said excitation winding producing an electromagnetic force acting upon said sliding vanes, and wherein said electromagnetic force can be adjusted by varying the current intensity of the current flowing-through said excitation winding, each said longitudinal edge being configured such that fluid passing thereunder forms a fluid wedge for exerting a braking effort upon the rotor housing, said fluid wedge having a thickness governed by the electromagnetic force and the pressure differential developed between two neighboring working chambers adjacent the associated sliding vane.

2. The rotary vane pump as defined in claim 1, further including working chambers provided at both a pressure side and suction side of the pump, said working chambers being flow connected with one another via throttle means.

3. The rotary vane pump as defined in claim 2, wherein said throttle means are constructed to be adjustable with the aid of control means independent of the current flowing-through the excitation winding.

4. The rotary vane pump as defined in claim 1, wherein each said longitudinal edge is rounded in order to form said fluid wedge for exerting a braking effort upon said rotor housing.

5. The rotary vane pump as defined in claim 1, further including working chambers provided at both the pressure side and suction side of the pump, said working chambers being flow connected with one another via throttle means.

6. A rotary vane pump, comprising a rotor housing, a stator arranged within the rotor housing, a plurality of radially displaceable sliding vanes disposed within the rotor housing and coacting with the stator, means for electromagnetically actuating said sliding vanes to enable said rotary vane pump to function as a hydraulic brake, said electromagnetically actuating means comprises an excitation winding carried by said stator, the flow of an excitation current through said excitation winding producing an electromagnetic force acting upon said sliding vanes, said electromagnetic force can be adjusted by varying the current intensity of the current flowing-through said excitation winding, working chambers provided at both a pressure side and suction side of the pump, said working chambers being flow connected with one another via throttle means, said throttle means are constructed to be adjustable with the aid of control means independent of the current flowing through the the excitation winding, a stationary shaft, said rotor housing being mounted to be rotatable about said stationary shaft and adapted to be connected with an element which is to be braked, said rotor housing being formed of a non-magnetizable material, said rotor housing enclosing a substantially cylindrical internal compartment which is arranged substantially coaxially with respect to said stationary shaft, said internal compartment having opposed ends and being sealed in a pressure-tight manner at both said ends by substantially flat flange means disposed perpendicular to the lengthwise axis of said stationary shaft, said stator possessing a substantially cylindrical configuration and being secured in eccentrically offset relationship at said stationary shaft with an eccentricity defined by the value S, the outer diameter of said stator being smaller than the inner diameter of the internal compartment of the rotor housing by a value amounting to at least 2S, said stator being provided at its periphery with a magnetizable ring member possessing a substantially U-shaped cross-sectional configuration, said ring member being provided at its outer surface in the circumferential direction thereof with a coaxial groove, said excitation winding being mounted in said coaxial groove, said coaxial groove and said excitation winding being surrounded by a stator sleeve formed of a non-magnetizable material, said rotor housing being provided with guide grooves substantially uniformly distributed over the periphery of said rotor housing, each of said guide grooves having opposed substantially parallel walls and opening towards the internal compartment of said rotor housing, said guide grooves extending in substantially radial direction, said guide grooves being bounded in the axial direction by said flange means, a respective one of said sliding vanes being movably guided in radial direction in each of said guide grooves, each of said sliding vanes being formed of a magnetizable material, said sliding vanes being moved against the sleeve of the stator due to a magnetic flux induced in the stator ring member owing to the current flowing-through the excitation winding, said guide grooves and an endless working compartment defined by said internal compartment and located between the rotor housing and the stator sleeve being filled with a braking fluid.

7. The rotary vane pump as defined in claim 6, wherein said stator sleeve seals said coaxial groove and said excitation winding in a substantially pressure-tight manner.

8. The rotary vane pump as defined in claim 6, wherein the rotor housing is provided at its outer surface with radially outwardly projecting protuberances enclosing said guide grooves, and cooling fins extending in the circumferential direction of the rotor housing for interconnecting said protuberances with one another.

9. The rotary vane pump as defined in claim 5, wherein each of the sliding vanes has a bore for the through-passage of braking fluid between the base of the associated guide groove and the internal compartment of the rotor housing.

10. The rotary vane pump as defined in claim 5, wherein the stator possesses a substantially cylindrical rotary slide valve for forming at least one of said adjustable throttle means, said rotary slide valve being provided at its outer surface at a substantially uniform spacing from one another with longitudinal grooves extending in the axial direction of the rotary slide valve, said magnetizable ring member having a pair of pole legs, first radial bores provided in one of the pole legs of the ring member, said first radial bores being distributed over approximately one-half of the circumference of the ring member at substantially the same angular spacing from one another as said longitudinal grooves and flow communicating with the pressure-side working chambers, the diameter of said first radial bores being smaller than the width of said longitudinal grooves, second radial bores provided at the other pole leg and distributed in spaced relation from one another over substantially the other half of the circumference of the ring member, said second radial bores flow communicating with the suction-side working chambers, said rotary slide valve being selectively adjustably positionable in order to adjust the angular position of the longitudinal grooves relative to the radial bores, said longitudinal grooves having side walls with edges for selectively covering inner openings of said radial bores to a desired extent and forming the adjustable throttle means.

11. A rotary vane pump, comprising a rotor housing filled with a braking fluid, a stator cooperating with said rotor housing, said stator and rotor housing being eccentrically arranged and possessing a constant eccentricity with respect to one another, a plurality of radially displaceable sliding vanes carried by the rotor housing and each having a longitudinal edge coacting with the stator, each two successive sliding vanes forming therebetween a working chamber, the braking fluid in the working chambers to each side of each sliding vane being at different pressures during operation, means for electromagnetically actuating such sliding vanes to enable said rotary vane pump to function as a hydraulic brake, said electromagnetically actuating means comprising an excitation winding carried by such stator, the flow of an excitation current through said excitation winding producing an electromagnetic force acting upon said sliding vanes, said electromagnetic force being adjustable by varying the current intensity of the current flowing through said excitation winding each said longitudinal edge being rounded such that fluid passing thereunder forms a dynamic fluid wedge for exerting a braking effort upon the rotor housing, said dynamic fluid wedge having a thickness governed by the electromagnetic force and the pressure differential developed between two neighboring working chambers adjacent the associated vane.

* * * * *